United States Patent [19]

Mörz et al.

[11] 3,978,434

[45] Aug. 31, 1976

[54] SYSTEM SEPARATING FILTER FOR SEPARATING FIRST AND SECOND DOUBLY POLARIZED FREQUENCY BANDS

[75] Inventors: Günter Mörz, Ludwigsburg; Stilianos Tokouzbalidis, Backnang, both of Germany

[73] Assignee: Licentia Patent-Verwaltungs-G.m.b.H., Frankfurt am Main, Germany

[22] Filed: Sept. 10, 1975

[21] Appl. No.: 611,974

[30] Foreign Application Priority Data

Sept. 10, 1974 Germany............................ 2443166

[52] U.S. Cl................................. 333/6; 333/21 A; 333/73 W; 333/98 R
[51] Int. Cl.² ...................... H01P 1/16; H01P 1/20; H01P 5/12
[58] Field of Search............. 333/6, 11, 21 A, 73 W; 343/756, 786

[56] References Cited

UNITED STATES PATENTS

| | | | |
|---|---|---|---|
| 3,731,235 | 5/1973 | Ditullio et al. | 333/6 |
| 3,731,236 | 5/1973 | Ditullio et al. | 333/21 A X |
| 3,838,362 | 9/1974 | Kurtz | 333/21 A X |
| 3,914,764 | 10/1975 | Ohm | 333/21 A X |

*Primary Examiner*—Paul L. Gensler
*Attorney, Agent, or Firm*—Spencer & Kaye

[57] ABSTRACT

A system separating filter for separating first and second signals each consisting of a doubly polarized frequency band with the two bands being of different frequencies. The filter includes first, second and third series connected doubly polarizable waveguide sections with the first waveguide section having an inner cross section of such dimensions that both frequency bands can exist therein with their respective dual polarizations, and with the second waveguide section serving as a transition piece between the first waveguide section and the third waveguide section which has an inner cross section of such dimension that at least the second frequency band can exist. Means are provided for causing the first frequency band to form standing waves in the second waveguide section which is provided with two coupling arrangements, each associated with one of the two directions of polarization and each including a pair of coupling elements which are symmetrically disposed opposite one another in the walls of the second waveguide section, for coupling out the first frequency band and blocking the second frequency band, with the electrically effective reflection plane of each coupling arrangement effecting a total reflection for the second frequency band. The outputs of each coupling arrangement are connected together via a respective hybrid circuit so that a signal corresponding to each polarization of the first frequency band is separately available at the summing output of the associated hybrid circuit. A polarization filter is connected to the third waveguide section to provide separate output signals corresponding to the two polarizations of the second frequency band.

12 Claims, 5 Drawing Figures

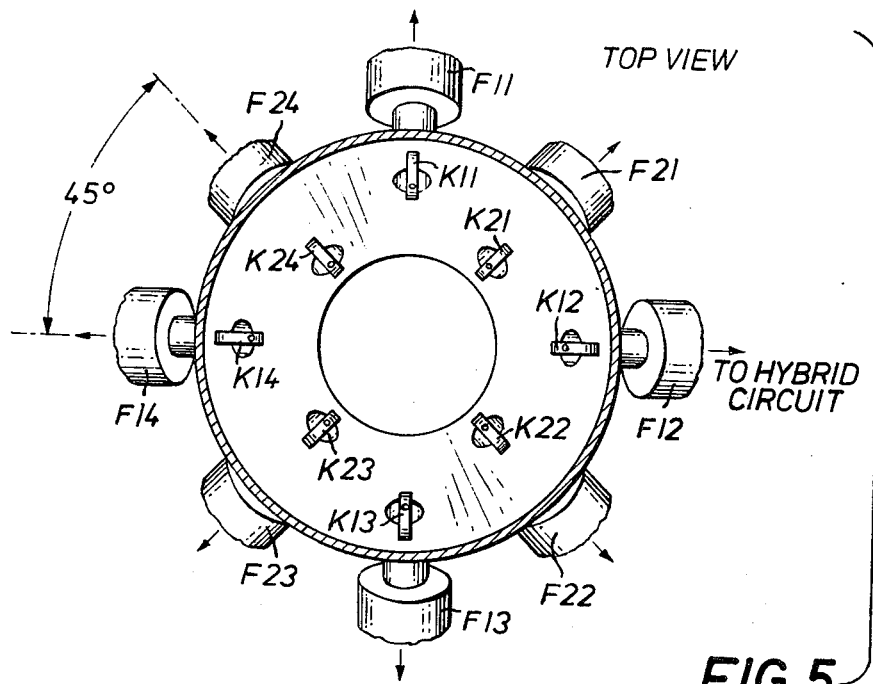
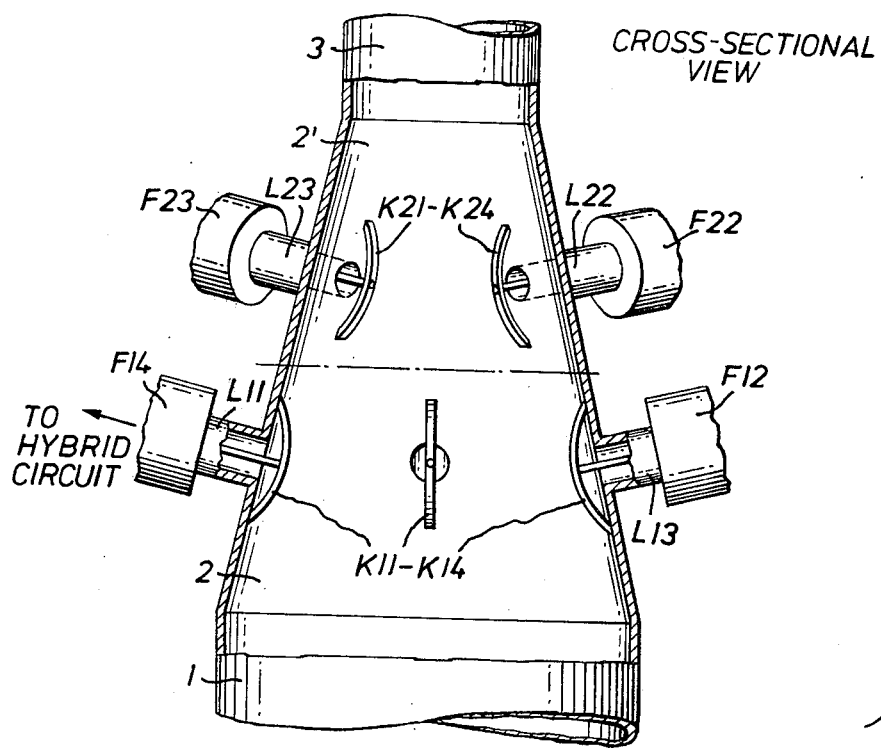
FIG.5

SYSTEM SEPARATING FILTER FOR SEPARATING FIRST AND SECOND DOUBLY POLARIZED FREQUENCY BANDS

BACKGROUND OF THE INVENION

The present invention relates to a system separating filter for separating two signals wherein each includes a doubly polarized frequency band with the two bands being at different frequencies. More particularly, the present invention relates to such a filter which includes a first waveguide section in which both frequency bands exist with their respective double polarizations, a second waveguide section which serves as a transition piece and a third waveguide section.

The construction of highly intertwined radio communication-links and the local conditions of limited space on the antenna platforms of radio towers make it seem desirable to utilize broadband antennas in at least two frequency bands with two polarizations. Particularly favorable is a broadband antenna (e.g. a parabolic horn, a Cassegrain antenna or a parabolic reflector antenna) with offset feed in conjunction with an appropriately designed separating filter. Such filters have previously usually been designed with selective 0 dB couplers, the main drawbacks of which are their great structural length, their coupling losses and the excitation of higher, undesired wave modes.

SUMMARY OF THE INVENTION

It is therefore the object of the present invention to provide a separating filter which avoids these prior art drawbacks, i.e., great structural length, coupling losses in the 0 dB couplers and the generation of higher wave modes.

This is accomplished according to the present invention by providing three series connected doubly polarizable waveguide sections with the first section having an inner cross section of such dimensions that both frequency bands with their respective double polarizations can exist therein, the second waveguide section serving as a transition between the first and third waveguide sections and the third waveguide section having an inner cross section of such dimensions that at least the second frequency band with its double polarizations can exist therein. Means are provided in the waveguide sections for preventing the propagation of the second frequency band from the second to the third waveguide section so that the second frequency band forms standing waves in the second waveguide section. First and second coupling means, each associated with a respective one of the two polarization directions and each including a pair of coupling elements which are disposed opposite one another in the walls of the second waveguide section, are provided for decoupling and passing the first frequency band while effecting a total reflection of the second frequency band. The two outputs of the first coupling means are connected to the inputs of a first hybrid circuit and the two outputs of the second coupling means are connected to the two inputs of a second hybrid circuit so that separate signals for each polarization are available at the summing output of the respective hybrid circuits. A polarization filter is connected to the third waveguide section, in which only the second frequency band exists, and provides separate signals corresponding to the two polarizations of the second frequency band at its outputs.

Such a system filter is a passive element and can thus also be operated reciprocally. The coupling elements employed in this filter are advisably formed as longitudinal or transverse slots, inductive coupling means or as longitudinal bar couplings. The required selection means may be in the form of waveguides or lines of TEM-Type. The first or second waveguide sections advantageously includes compensation means, preferably pins arranged under an angle of 45° with respect to the polarization directions, for correcting or matching the two frequency bands independently of one another.

The system filter according to the invention is very small in size, prevents coupling losses and avoids the formation of higher wave modes. Furthermore, the filters according to the invention can also be used to produce waves with right-hand and/or left-hand rotation and with circular polarization (dual polarization) in a plurality of frequency bands when further connection means are employed or a circular polarizer is used. It is also possible to connect a plurality of the filters according to the invention in series. The present invention solves the problem of providing seperate waveguide-connections to a broadband-antenna for dual polarization directions and at least two frequency bands.

The present invention is basically realized by three separate measures:

The first measure is the prevention of the propagation of the first frequency band into the third waveguide section by the generation of a total reflection for the waves of the first, preferably the lower, frequency band by varying the waveguide cross section or by the insertion of filter elements. The second measure provides for decoupling of the standing wave by means of symmetrically disposed coupling arrangements including coupling elements which may be waveguides or lines of TEM-Type e.g. coaxial or strip-line devices. The third measure consists in imparting filter characteristics to the coupling arrangements which characteristics may be imparted to the coupling elements themselves or to the series-connected lines. This prevents decoupling of the second, preferably upper, frequency bands in the continuous channel or the decoupled energy of these bands is reflected so that the reflection reaction is reduced to a minimum.

Unequivocal outputs for the decoupled polarization P1, and P2, associated with the first frequency band, and the polarizations P3 and P4, associated with the second frequency band, are realized by pair-wise connection of the decoupled signals with a network. By interconnecting the two outputs, which are associated with the individual polarizations P1, P2, P3, P4, with a further network, outputs are obtained for right-hand and left-hand rotation, circular polarization or for follow-up linear polarization.

BRIEF DESCRIPTION OF THE DRAWINGS

FIG. 5 is the series-connection of two round waveguide sections each provided with decoupling elements associated to two frequency bands, whereby the second waveguide-section with its decoupling means is turned 45° around the axis.

DETAILED DESCRIPTION OF THE PREFERRED EMBODIMENTS

Figure 1:
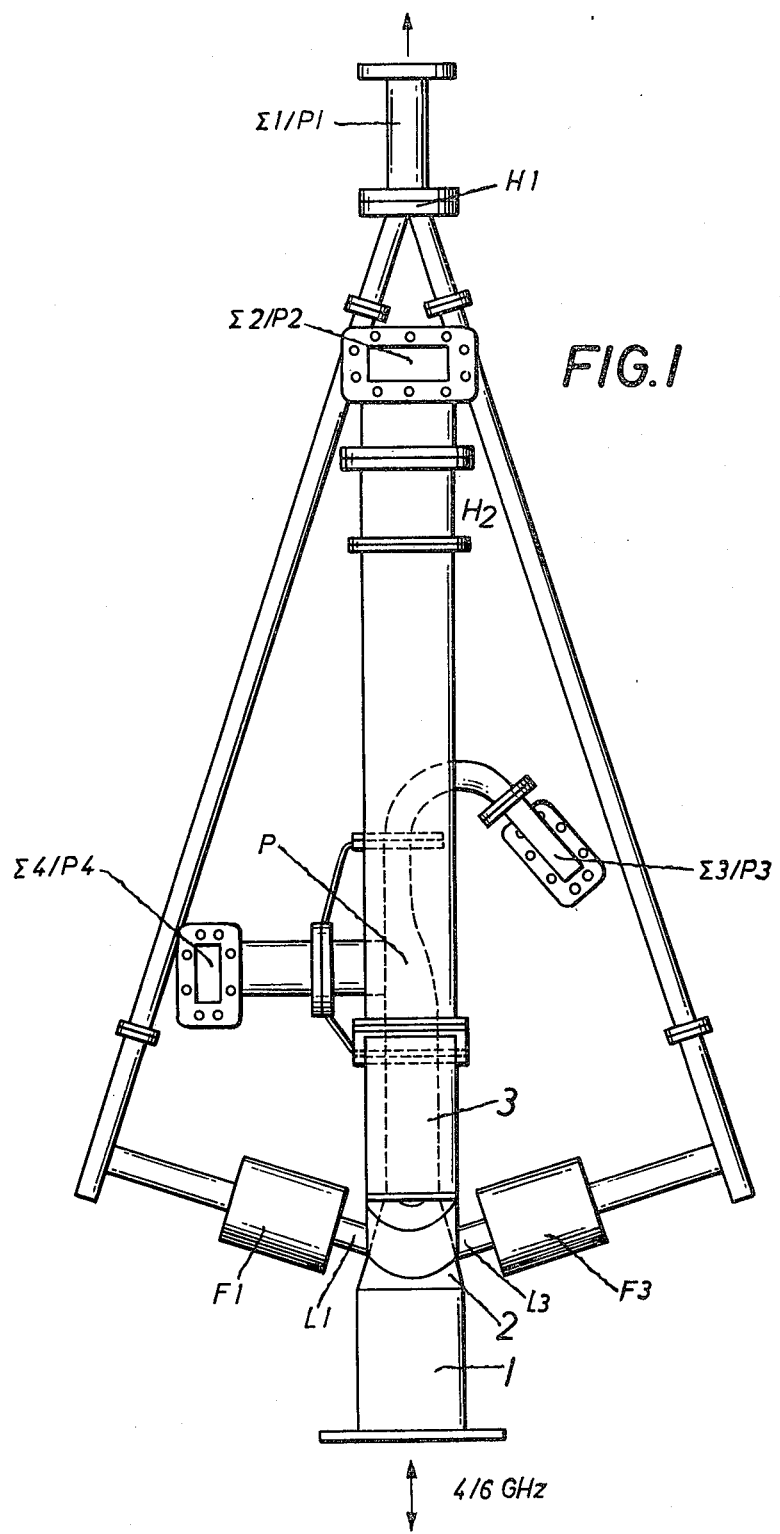
FIG. 1 is a schematic representation of the basic scheme of the system separating filter of the present invention.
Figure 2:
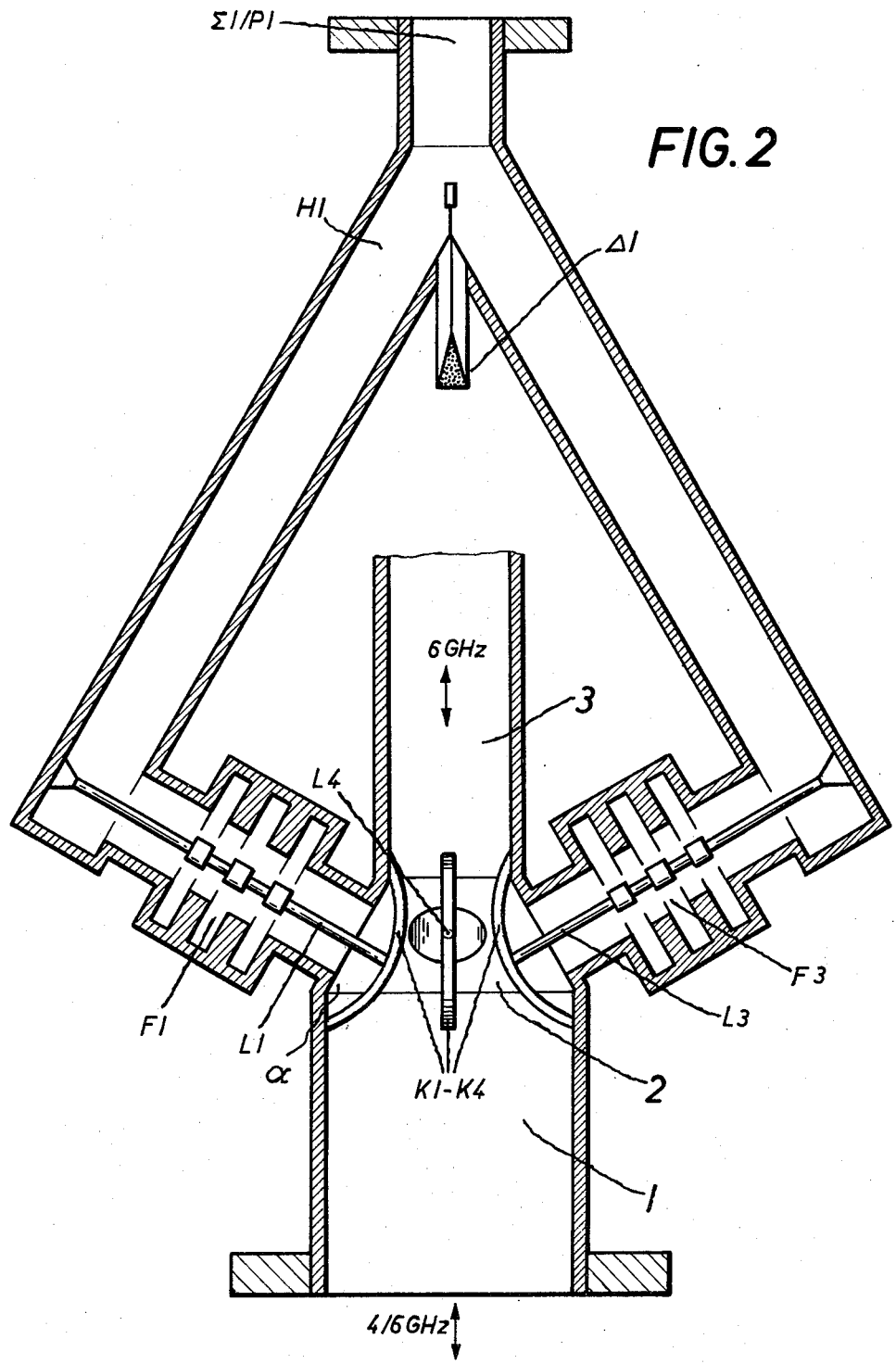
FIG. 2 is a partial longitudinal sectional view of the system separating filter of FIG. 1, particularly showing the portion for the lower frequency band.
Figure 3:
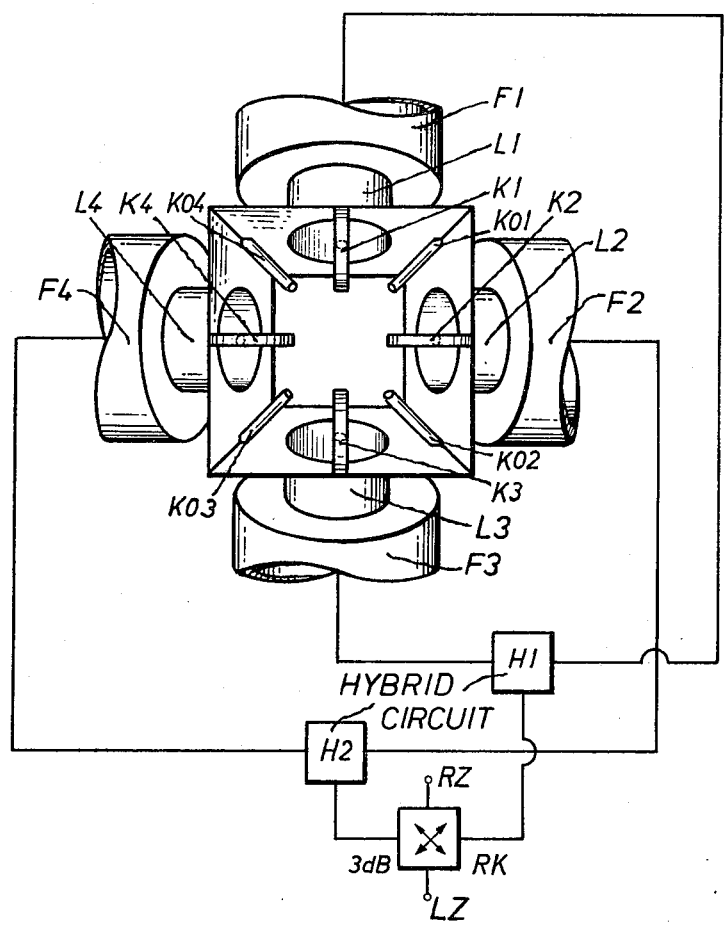
FIG. 3 is a schematic cross sectional view of the waveguide sections 1 and 2 of FIGS. 1 and 2 further illustrating, in block circuit form, the subsequent network in the basic circuit diagram of FIG. 1.

FIGS. 1–3 are a schematic representation of the system separating filter according to the present invention for frequency bands in the 4 and 6 GHz range. As shown, the filter includes three series connected doubly polarizable waveguide sections 1, 2 and 3. The first waveguide section 1 is intended to transmit both frequency bands and may have a simple square or circular inner cross section with dimensions designed for the lower transmission band, i.e., the band in the 4GHz range. In case the system separating filter is to be used in conjunction with a parabolic horn antenna or some other horn-fed antenna, the waveguide section 1 may have the shape of a truncated pyramid or a cone, respectively.

The second waveguide section 2 forms the transition from the first waveguide section 1 to the third waveguide section 3 in which the wave of the lower frequency band are not to be propagated. In the illustrated embodiment the propagation of the lower frequency band in the third waveguide section 3 is prevented by providing the inner cross section of the third waveguide section 3 with dimensions corresponding to the propagation of the higher frequency band, i.e., the band in the 6GHz range. That is, the dimensions of waveguide section 3 are designed so, that propagation of the lower frequencies are forbidden. The waveguide section 2 according to the preferred embodiment thus has an inner cross section which continuously varies, in the longitudinal direction, from that of the waveguide section 1 to that of the waveguide section 3 and serves as a transition section.

The pitch angel $\alpha$ of the waveguide section 2 may be selected between 0° and 90° depending on the relative width of the band to be transmitted. The greater the required bandwidth, the greater angle $\alpha$ must be. For example, for a relative bandwidth of 13% a pitch angle of $\alpha = 12.5°$ is sufficient.

The highpass filter characteristics of the third waveguide section 3 produce standing waves in the lower frequency band (4GHz) in the first or input waveguide section 1 and in the front portion of the second or intermediate waveguide section 2. This lower frequency band is decoupled by means of four doubly symmetrically arranged coupling elements K1, K2, K3 and K4 disposed in the walls of the waveguide section 2. The double symmetry is necessary because otherwise higher waveguide wave modes could possibly be excited for the upper frequency band. The coupling element K1, K2, K3, K4 (see FIGS. 2 and 3) in the waveguide section 2 are advantageously provided in the form of coaxial couplings. Although waveguide decoupling elements are also possible, they are more difficult to handle in the upper frequency range. Particularly favorable properties are exhibited by the so-called longitudinal bar decoupling elements shown in the figures because of their broadband properties which are here utilized. For each one of the two 4GHz polarizations P1 and P2, two oppositely disposed coupling element pairs K1, K3 and K2, K4 respectively are provided. Of course, portions of the upper frequency band are also decoupled by the coupling elements K1, K2, K3 and K4. However, for a 4 GHz longitudinal bar decoupling element, the 6GHz coupling attenuation is approximately 10 dB, which constitutes a good preselection. This longitudinal bar coupling element is described in the German patent DT-PS No. 1,292,223.

As mentioned above, the third measure according to the invention consists in imparting filter characteristics to the coupling elements themselves or to the series-connected transmission lines. This measure utilizes the decoupled higher frequency energy for the reflection compensation of the interference produced by the decoupling in the continuous higher frequency channel. This is accomplished by the inclusion of frequency selective arrangements or filters F1, F2, F3, F4 into the transmission lines L1, L2, L3, L4, respectively which are connected in series with the coupling elements K1, K2, K3, K4 respectively. These filters F1, F2, F3, F4 must block the upper frequency band and pass the lower frequency band.

The blocking effect produces total reflection which can be reproduced by a fictitious short-circuit plane. The transformation length between the short-circuit plane of the filter for the upper frequency band and the associated coupling element can be utilized extraordinarily effectively as a compensation means for the reflection of the continuous channel. This reflection is produced by the geometry of the coupling elements and the waveguide section 2. The compensating effect is very distinct and is repeated when the compensation length is changed by $\lambda/2$. The best broadband effect is attained with the shortest possible length.

This blocking effect produced by the stop-band characteristics of the filters leads to a total reflection of the blocked waves. This effect is of fundamental nature and can be observed at any microwave filter with stop-band characteristics. The fact of stop-band-isolation leads to a nearly total reflection of the waves. The reference-plane of the reflection coefficient depends on the type of filter and its electrical characteristics. In the assumed case of an ideal, lossless filter with infinite stop-band-isolation the reflection coefficient is one. In theory the reference plane of the reflection can be replaced by a fictitious short-circuit-plane. The electrically effective length between the assumed fictitious short-circuit-plane and the coupling elements is called the compensation length.

The filters F1, F2, F3, F4 may be lowpass filters, bandpass filters and band blocking filters. When coaxial lines L1, L2, L3, and L4 are used, coaxial lowpass filters or radial circuit blocks are particularly well suited. Depending on their dimensions, these filters produce the desired selection between the upper and lower frequency band.

Coaxial low-pass-filters which are suitable for operation as filters F1–F4 are described in Mathaei, Young, Jones: "Microwave Filters, Impedance Matching Networks, and Coupling Structures", Mc. Graw Hill on page 355 – 358. The radial-line coaxial filters which are mentioned alternatively are described in MTT-11 (1963) page 50 – 55: De Loach, B. C.: "Radial-line coaxial filters in the microwave region".

The respective pairs of transmission lines L1, L3, and L2, L4 are connected together over the same electrical length via respective 180° hybrid circuits H1 and H2.

At each of the sum outputs, Σ1, Σ2, of the hybrid circuits H1 and H2 there is then available the energy of one polarization P1 or P2 respectively. The difference outputs Δ1, Δ2 of the respective hybrid circuits H1 and H2 are terminated with absorbers. The outputs for horizontal and vertical polarization may additionally be connected to a 3 dB coupler RK as shown in FIG. 3. Thus it is possible to obtain outputs for operation of the separating filter with right-hand rotation and left-hand rotation circularly polarized signals RZ and LZ.

The waveguide section 3 for the upper frequency range is provided with a polarization filter P in order to separate the horizontal and vertical polarization P3 and P4 respectively. If this band is also to be operated with circular polarization, a circular polarizer (not shown) must be included between the waveguide section 3 and the polarization filter P. The two outputs of the polarization filter P in this case constitute the gates for the right-hand rotation and left-hand rotation circularly polarized signals. A polarization filter P (in other publications called "Ortho-mode-transducer") is described in the English patent specification No. 767,518.

Instead of utilizing a polarizer as mentioned above to produce circular polarization, it can also be obtained by connecting the two outputs of the polarization filter P with a 3 dB coupler (not shown) corresponding to that used for the lower frequency band in FIG. 3. The differing electrical lengths of the two outputs can be corrected, in a known manner, by means of a phase equalization connection.

It is possible to dispose compensating or correcting pins K01, K02, K03, K04 (FIG. 3) in a diagonal arrangement in the corners of the first or second waveguide section, i.e., at an angle of 45° with respect to the waveguide walls. In this way only one frequency band of the two frequency bands will be influenced or corrected, respectively, with respect to its matching. These correcting pins K01, K02, K03, K04 must of course be arranged in a predetermined cross-sectional plane in double symmetry with respect to the waveguide section involved. The double symmetry is required because otherwise the polarization coupling and the suppression of the higher wave modes would no longer be assured. The 45° arrangement is necessary because matching of the two frequency bands is not equally good. In this way it is possible to correct the matching of the worse frequency band independently of the better matched frequency band.

The dimension of the arrangement of FIGS. 1–3 for the 4- and 6-GHz-frequency bands are as follows: The total length of the complete diplexing Ortho-mode-transducer is 500 millimeters. The depth of the corrugations at the outer conductor of the radial-line-coaxial filters F1–F4 is approximately a quarter-wave length of the 6-GHz-frequency. The length of the longitudial bars K1–K4 is approximately half a wavelength of the 4-GHz-frequency.

The arrangment according to FIGS. 1–3 associates the continuous waveguide channel with the upper frequency band and the decoupled waves with the lower frequency band. The reverse is of course also possible in which the standing waves are no longer produced by means of a variation of the cross section of doubly polarizable waveguide section 2. In this case a blocking structure which is equally effective in both polarizations must be provided for the upper frequency bands in the waveguide section 2 which structure produces the standing waves which are then decoupled in a similar manner as in the first embodiment by means of pairs of coupling elements. Here waveguide decoupling elements are of advantage since the highpass filter characteristics of the waveguide decoupling elements themselves constitute the frequency selective arrangements of filters defined in the embodiment according to the present invention.

Figure 4:
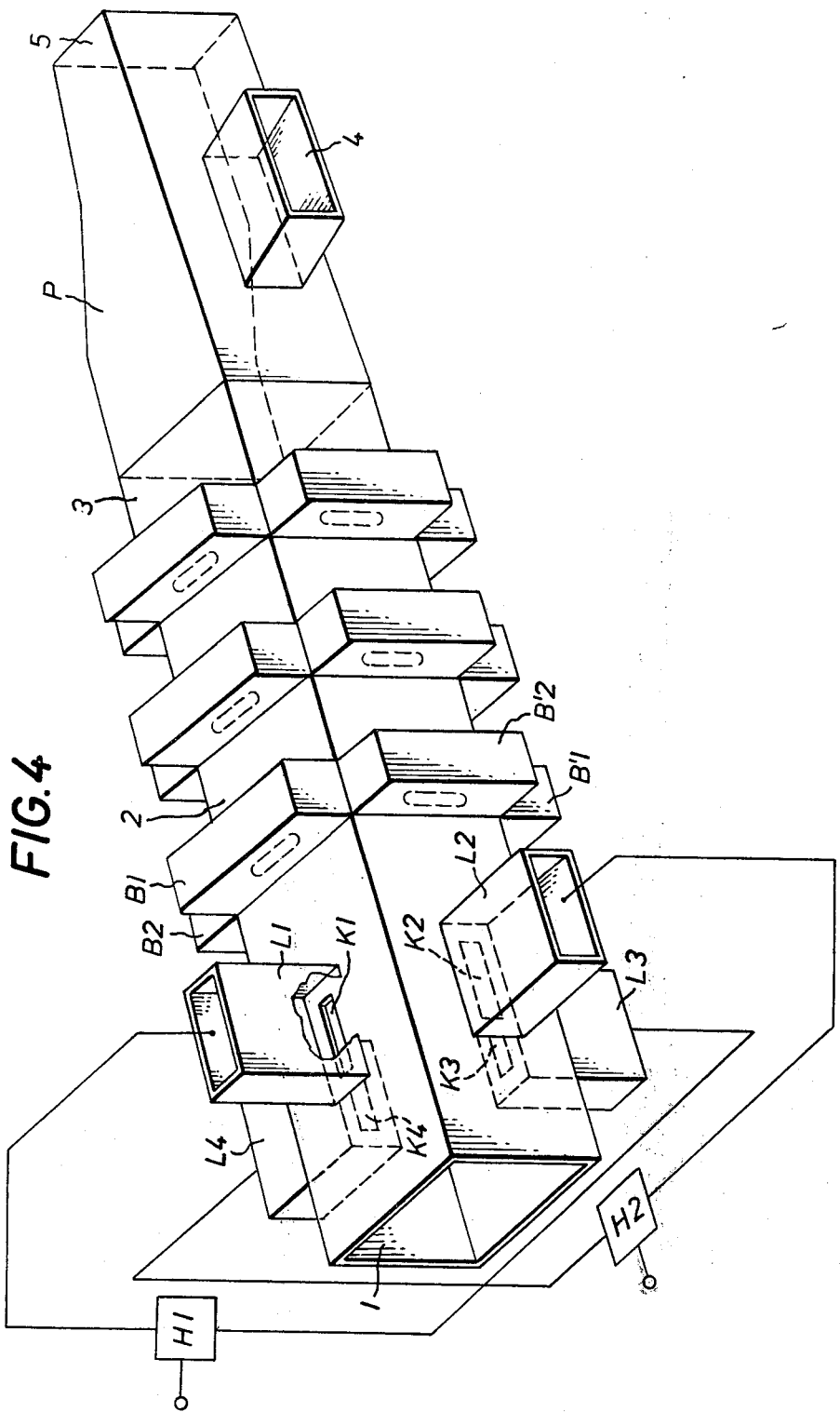
FIG. 4 is a schematic view of another diplexing Orthomodetransducer-design using a blocking-structure in the waveguide-section 2.

FIG. 4 shows an embodiment of this arrangement with the waveguide-sections 1, 2, 3 and the decoupling elements K1–K4 between the waveguide-sections 1 and 2. The decoupling elements, in this embodiment are longitudinal slots. The coupling slots K1–K4 feed into a total of four waveguide-sections L1–L4 which operate as high-pass-filters for the upper frequency-band. This means that the lower frequency-band is blocked by the high-pass-characteristics of these waveguides. These waveguides are connected symmetrically in pairs to the Hybrids H1 and H2. The dual polarized waveguide-section 2 is provided with the components B1, B1', B2, B2' of a plurality of blocking elements operating as stop-band-filters for both polarizations of the upper frequency-band. In the drawn example of FIG. 4 these stop-band-filters are designed as waveguide-resonators associated to the waveguide-section 2. Their distance along the axis of waveguide-section 2 is approximately three times a quarter wave length of the upper mid-band-frequency. Naturally this blocking structures may be of another filter design, e.g. a low-pass-structure or a band-pass-structure. The output of the waveguide-section 3 is connected to the polarization-filter P operating as an Ortho-mode-transducer for the lower frequency-band. The waveguide outputs 4 and 5 are associated to the two polarizations.

A very significant modification of the system separating filter is realized by the series connection of a plurality of system separating filters, particularly those of the type initially described and illustrated in FIGS. 1–3.

When waveguide sections according to FIG. 1 are connected in series and are associated with different frequency bands, there arises the problem that the longitudinal expanse of the coupling element will not permit any desired close proximity of two frequency bands. The thus fixed spacing of the center frequencies fm1 and fm2 of the two frequency bands lies at approximately fm2 ~ 1.5 fm1. This limit can be avoided with the use of circular waveguides in that two adjacent frequency bands are coupled in only in the first conical waveguide section 1 with an axial and radial offset of 45° with respect to one another. The corresponding coupling elements K11, K12, K12, K14 are associated with the lower frequency band and the further coupling elements K21, K22, K23, K24 are associated with the adjacent upper frequency band. The second waveguide section 2 is designed as a transition from the conical to the cylindrical waveguide and serves to transmit further frequency bands f>> fm2. The decouplers K11, K12, K13, K14 are associated with radial circuit blocks F11, F12, F13, F14 which block frequency band fm2.

FIG. 5 shows the arrangement of two series connected round waveguide-sections 2 and 2' each provided with a total of four decoupling elements K11–K14 and K21–K24, transmission lines L11–L14 and L21–L24, filters F11–F14 and F21–F24.

The four filters associated to one waveguide-section must be designed so that the pass-band corresponds to the decoupled frequency-band while the stop-band blocks the other frequencies propagating in the waveguide-sections 2. The top view shows the 45°-offset of the decoupling elements associated to waveguide-sections 2 and 2', In waveguide section 3 the tranmission of a third frequency is possible whereby the connection of a polarization filter can provide the separation of the two polarizations.

It will be understood that the above description of the present invention is susceptible to various modifications, changes and adaptations, and the same are intended to be comprehended within the meaning and range of equivalents of the appended claims.

What is claimed is:

1. A system separating filter for separating first and second signals consisting of respective doubly polarized first and second frequency bands of different frequencies, said filter comprising: first, second and third doubly polarizable series connected waveguide sections, said first waveguide section having an inner cross section such that both of said first and second frequency bands can exist therein with their dual polarizations, said second waveguide sections serving as a transition between said first and third waveguide sections, and said third waveguide section having an inner cross section such that at least said second frequency band can exist therein with its dual polarizations; means for preventing the propagation of said first frequency band from said second waveguide section into said third waveguide section and for forming standing waves of said first frequency band in said second waveguide section; first and second coupling means, each including a pair of coupling elements symmetrically disposed opposite one another in the walls of said second waveguide section and each associated with a separate one of the two directions of polarization, for coupling out the respective polarizations of the signals in said second waveguide section and for passing said first frequency band and blocking said second frequency band with the electrically effective reflection plane of said coupling means for said second frequency band effecting total reflection of said second frequency band; a first hybrid circuit means, having its inputs connected to the outputs of said first coupling means, for providing an output signal corresponding to one polarization of said first frequency band at its summing output; a second hybrid circuit means, having its inputs connected to the outputs of said second coupling means, for providing an output signal corresponding to the other polarization of said first frequency band at its summing output; and a polarization filter connected to said third waveguide section for providing separate output signals corresponding to the respective polarizations of said second frequency band.

2. A system separating filter as defined in claim 1 wherein the inputs and outputs of the system separating filter are reciprocal.

3. A system separating filter as defined in claim 1 wherein said coupling elements are slots formed in the walls of said second waveguide section.

4. A system separating filter as defined in claim 1 wherein said coupling elements are longitudinal bar couplings.

5. A system separating filter as defined in claim 1 wherein each of said first and second coupling means further comprises: first and second transmission lines each connected to a respective one of said coupling elements of the associated said pair of coupling elements; and first and second frequency selection means connected in said first and second transmission lines respectively for passing said first frequency band and blocking said second frequency band, the electrically effective reflection plane of said frequency selective means effecting a total reflection of said second frequency band.

6. A system separating filter as defined in claim 5 wherein; said first frequency band is associated with frequencies which are lower than those of said second frequency band; and said means for preventing the propagation of said first frequency band comprises the inner cross section of said third waveguide section which has dimensions such that only said second frequency band can exist therein, and the inner cross section of said second waveguide section which continuously changes in the longitudinal direction from the inner cross-sectional dimensions of said first waveguide section to those of said third waveguide section.

7. A system separating filter as defined in claim 5 wherein said transmission lines and said selection means are provided as waveguides with high-pass characteristics.

8. A system separating filter as defined in claim 5 wherein said transmission lines and said selection means are provided as lines of TEM-Type.

9. A system separating filter as defined in claim 1 wherein said first frequency band is associated with frequencies which are higher than those of said second frequency band; and said means for forming standing waves of said first frequency band comprises filter means provided in said second waveguide section for blocking said first frequency band.

10. A system separating filter as defined in claim 9 wherein said coupling elements and the associated lines are effective as filter means for blocking said second frequency band.

11. A system separating filter as defined in claim 1 further comprising compensating means provided in one of said first and second waveguide sections at an angle of 45° with respect to the directions of said polarizations, for correcting the matching of one of said frequency bands.

12. A system separating filter as defined in claim 11 wherein said compensating means comprise pins symmetrically disposed in a predetermined cross-sectional plane of the associated said waveguide section.

* * * * *